March 26, 1963 E. SAUER ET AL 3,082,662
CAMERA VIEWFINDER WITH MIRROR ARRANGEMENT
FOR VIEWING LATERAL INDICATOR
Filed March 11, 1960 2 Sheets-Sheet 1

SEMI-TRANSPARENT
PLATE

3,082,662
CAMERA VIEWFINDER WITH MIRROR ARRANGEMENT FOR VIEWING LATERAL INDICATOR
Edgar Sauer and Helmut Ebertz, Stuttgart, Germany, assignors to Zeiss Ikon Aktiengesellschaft, Stuttgart, Germany
Filed Mar. 11, 1960, Ser. No. 14,339
Claims priority, application Germany Mar. 14, 1959
2 Claims. (Cl. 88—1.5)

The present invention relates to improvements in photographic cameras and particularly concerns viewfinders with exposure meters which are built into a camera.

It is an object of the invention to combine a viewfinder of the Galilean type with an exposure meter in which the movement of the indicating hand of the measuring instrument and other indicating marks are projected into the path of the rays of the viewfinder and are made clearly visible in the focal plane of the viewfinder ocular or into a conjugated plane.

Such a projection of the indicating hand and other indicating marks has the purpose to produce in the viewfinder a very sharp and clear image of the mentioned parts in addition to a sharp image of the subject to be photographed. For arranging this viewfinder in the camera there is usually only available the uppermost portion of the camera, namely the space directly below the top wall. This space in many cases is also used to accommodate the parts of a range finder and other parts reflecting an image boundary frame into the viewfinder. It is obvious, that this space is very limited in size and that particular measures must be taken to make the parts and the arrangement of the parts of a device as contemplated by the present invention sufficiently compact to be able to mount the same into the available space without increasing the size and particularly, the width of the camera.

With these and other objects in view, the invention will now be described in the following description with reference to the accompanying drawings, in which—

Figure 1:
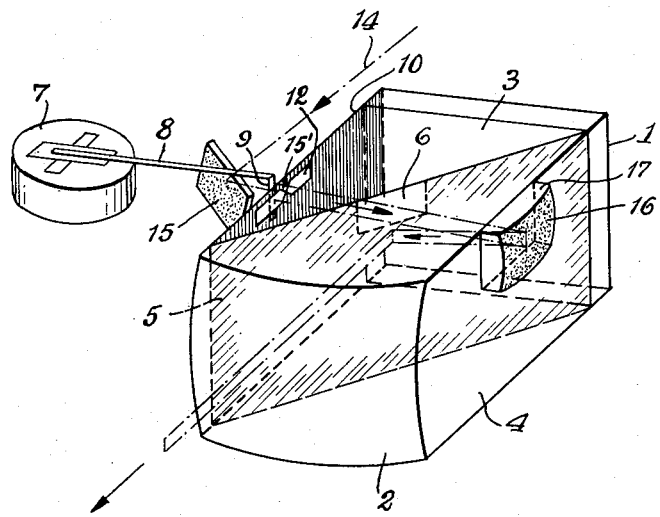
FIG. 1 illustrates diagrammatically one embodiment of the invention.

Referring to FIG. 1, the viewfinder device consists of an objective 1 and an ocular lens 2 which elements are united by a prism combination comprising two prisms 3 and 4 of which the prism 4 is formed integral with the ocular lens 2. The prisms 3 and 4 have a common diagonal face of contact 5 which forms a semi-transparent mirror layer reflector, with the exception of a small rectangular area 6 which is clear. The measuring instrument 7 of the exposure meter is arranged to the left of this iviewfinder device 1, 2, 3 and 4 in such a manner that the indicator hand 8 of the measuring instrument sweeps in a horizontal plane and is provided at its outer end with a vertically downwardly bent portion 9 which during the deflection of the indicator hand 8 moves adjacent to the left hand vertical face 10 of the prism 3. This vertical face 10 of the prism 3 is opaque with the exception of a clear window 12 which is arranged in horizontal alinement with the clear area 6 in the semi-transparent face of contact 5. The bent portion 9 of the indicator hand 8 is movable in front of the window 12 and is made clearly visible by light rays 14 coming from the subject viewed by the finder and reflected by an inclined mirror 15 arranged so as to be directed past the bent portion 9 into the window 12. The central portion of the window 12 is provided with a fixed indicating mark 15'. The light rays then pass through the clear area 6 and onto a concave mirror 16 arranged on a glass block 17 attached to the right hand vertical face of the prism 4. The concave mirror 16 is slightly tilted and reflects the light rays onto the semi-transparent mirror 5 which reflects the light rays into the ocular 2 so that the viewer can clearly see an image of the fixed mark 15 and an image of the bent portion 9 in the viewfinder image. The fixed indicating mark 15 indicates that a measuring instrument is used which requires a manual adjustment until the image of the bent portion 9 has been brought into registration with the image of the mark 15. If, however, the measuring instrument is not adjustable, then the deflection of the bent portion will be read off on a scale which will have to be reflected into the viewfinder image in similar manner as the fixed indicating mark 15.

Figure 2:
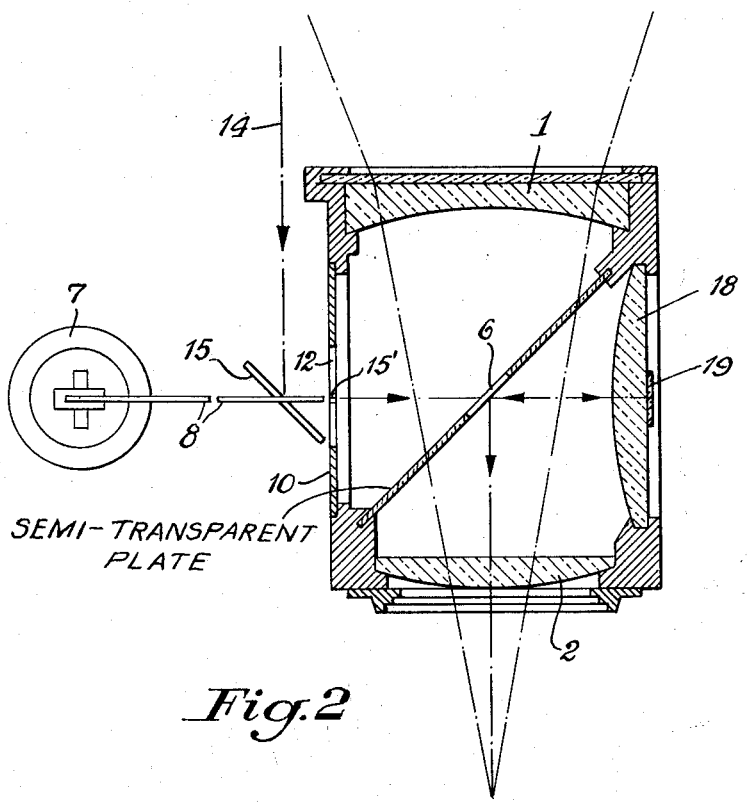
FIG. 2 illustrates another embodiment of the invention.

In FIG. 2 is shown another embodiment of the invention in which the glass block 17 with the concave mirror 16 thereon is replaced by a plano-convex lens 18 provided on a portion of its plane face with a mirror layer 19 arranged in alinement with the light rays passing through the clear area 6.

Figure 3:
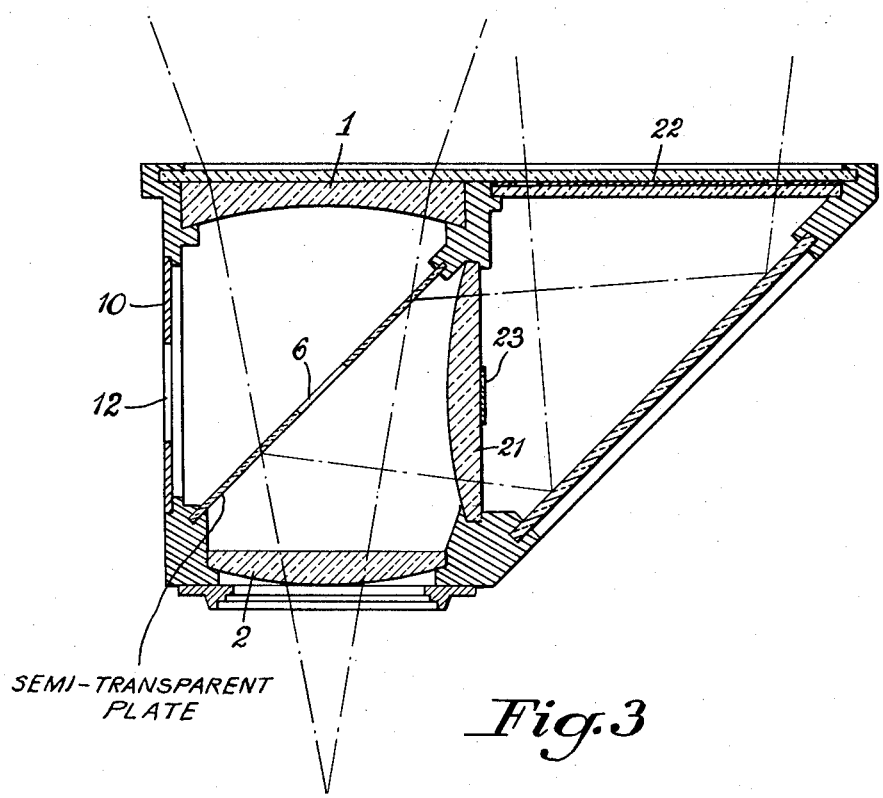
FIG. 3 illustrates still another embodiment of the invention.

FIG. 3 illustrates an embodiment of the invention in which there is employed an additional lens 21 for projecting the bright-line boundary of the viewfinder mask frame 22 into the focal plane of the finder ocular. This lens 21 is arranged adjacent the vertical side wall of the prism 4 and is also used as carrier of the mirror layer 23 which lies near the marginal line to produce the desired optical wedge or reflecting action.

The width of the camera equipped with a viewfinder device of the present invention need only be increased for all practical purposes in accordance with the dimensions of the film advancing and film rewind knobs plus a small space to accommodate the viewfinder. If, however, for instance the film rewind knob is arranged at the bottom wall of the camera casing and is connected by a suitable gearing with the drive portion of the film spool, which drive portion is located in the upper portion of the camera casing, then the width of the camera casing need only be made wider a dimension equal to the size of the film advancing knob, so that such a camera will have the smallest width which is possible.

What we claim is:

1. The combination with a viewfinder of the Galilean type, of an indicating instrument of an exposure meter, said viewfinder comprising an objective lens, an ocular lens and a prism combination arranged therebetween, said prism combination consisting of two prisms having a common diagonally arranged semi-transparent contact face and two oppositely arranged parallel spaced vertical side faces, said indicating instrument being provided with a movable indicating hand having a vertical portion movable adjacent one of said vertical side faces, means for laterally projecting an image of said vertical portion into said prism combination, and reflecting means at the other one of said vertical side faces for reflecting said image of said vertical portion onto said diagonal semi-transparent contact face and from the latter into said ocular lens, said reflecting means comprising a curved mirror surface, the vertical side face closest to said measuring instrument being opaque except for a clear portion at the upper edge through which an image of said vertical portion of said movable indicating hand is projected, said diagonal semi-transparent contact face having a clear transparent area in horizontal alinement with said clear portion in said vertical side face to permit the passage of light rays toward said curved mirror face which reflects the light rays back into said prism combination and onto said semi-transparent contact face.

2. The combination with a viewfinder of the Galilean type, of an indicating instrument of an exposure meter, said viewfinder comprising an objective lens, an ocular lens spaced from said objective lens, a pair of opposed vertical walls arranged in parallel spaced relation between said objective and ocular lenses and extending parallel to the axis thereof, a semi-transparent mirror extending obliquely between said walls and inclined with respect to the optical axis of the viewfinder, said indicating instrument being provided with a movable indicating hand having a vertical portion movable adjacent one of said walls, means for laterally projecting an image of said vertical portion through said semi-transparent mirror, and reflecting means on the other of said walls for reflecting an image of said vertical portion onto said semi-transparent mirror and from the latter into said ocular lens, said reflecting means comprising a curved mirror surface, the vertical wall adjacent said indicating instrument being opaque except for a clear portion at the upper edge through which an image of said vertical portion of said movable indicating hand is projected, said oblique semi-transparent mirror being provided with a clear transparent area horizontally aligned with the clear portion in said wall to permit the passage of light rays in the direction of said mirror which are reflected in the direction of said semi-transparent mirror and thence into said ocular lens.

References Cited in the file of this patent

UNITED STATES PATENTS

| | | |
|---|---|---|
| 2,352,644 | Linderman et al. | July 4, 1944 |
| 2,525,558 | Mihalyi | Oct. 10, 1950 |
| 2,861,505 | Winkler et al. | Nov. 25, 1958 |
| 2,933,991 | Sauer | Apr. 26, 1960 |
| 2,981,165 | Estes | Apr. 25, 1961 |

FOREIGN PATENTS

| | | |
|---|---|---|
| 915,652 | Germany | July 26, 1954 |
| 547,045 | Great Britain | Aug. 11, 1942 |